United States Patent [19]

Mayer

[11] Patent Number: 5,758,886
[45] Date of Patent: Jun. 2, 1998

[54] MULTIPLE CONTAINER TRANSPORTATION SYSTEM

[76] Inventor: Susan M. Mayer, 31 Rowlery Hill Rd. P.O. 411, Sterling, Mass. 01564-0411

[21] Appl. No.: 588,137

[22] Filed: Jan. 18, 1996

[51] Int. Cl.⁶ ........................................ B62B 1/12
[52] U.S. Cl. ........................ 280/47.26; 280/79.2
[58] Field of Search ................ 280/47.17, 47.19, 280/47.26, 47.27, 79.2, 47.35, 47.21; 220/212, 380, 605, 756; 206/505, 515, 518, 519, 520, 510

[56] References Cited

U.S. PATENT DOCUMENTS

| | | | |
|---|---|---|---|
| 1,219,969 | 3/1917 | Lowe | 220/756 |
| 1,729,126 | 9/1929 | Reimer | 220/212 |
| 3,027,045 | 3/1962 | Wilson | 206/505 |
| 3,967,548 | 7/1976 | Moriconi | 280/79.2 |
| 4,118,048 | 10/1978 | Spranger et al. | 280/79.2 |
| 4,512,493 | 4/1985 | Von Holdt | 220/782 |
| 4,572,374 | 2/1986 | Sirotkin | 206/518 |
| 4,648,522 | 3/1987 | Wise | 206/519 |
| 4,928,839 | 5/1990 | Kruelskie | 206/508 |
| 4,930,636 | 6/1990 | Meadows | 206/503 |
| 5,062,539 | 11/1991 | Chandler | 220/212 |
| 5,150,804 | 9/1992 | Blanchet et al. | 220/212 |
| 5,240,264 | 8/1993 | Williams | 280/47.26 |
| 5,445,397 | 8/1995 | Evans | 280/47.19 |
| 5,464,104 | 11/1995 | McArthur | 280/47.19 |
| 5,595,395 | 1/1997 | Wilson | 280/47.19 |

FOREIGN PATENT DOCUMENTS

| | | | |
|---|---|---|---|
| 1012977 | 12/1965 | United Kingdom | 206/47.19 |

*Primary Examiner*—Brian L. Johnson
*Assistant Examiner*—Frank Vanaman
*Attorney, Agent, or Firm*—Jacob N. Erlich; Jerry Cohen

[57] ABSTRACT

A multiple container transportation system having a moveable frame for transporting the frame from one location to another and at least one container unit removably secured to the moveable frame. The container unit is made up of a container and a cover. The container has an open top portion of predetermined internal size and a closed bottom portion of a predetermined external size less than the predetermined size of said top portion. The top portion is angled from the back of the container to the front of the container such that the front of the container has a height less than the height of the back of the container. This design enables an animal easy access to the contents of the container and also prevents any spilling of the contents during tilting of the container and frame during movement thereof. The cover is positionable upon the top portion of the container and is configured such that the top of the cover, when in position on the top portion of the container, is substantially parallel to the bottom portion of the container so that another container can fit upon the cover of another container.

15 Claims, 3 Drawing Sheets

MULTIPLE CONTAINER TRANSPORTATION SYSTEM

FIELD OF THE INVENTION

This invention relates generally to containers and, more particularly, to a multiple container transportation system for providing water to remote locations, preferably for access by animals.

BACKGROUND OF THE INVENTION

There are many circumstances when it becomes necessary to transport water to remote locations, particularly locations which do not have ready access to water. These circumstances may occur at, for example, horse shows or other such agricultural events, garden work or household projects. It is especially difficult to access water at horse shows where large animals are either tied down or otherwise restrained in remote locations, great distances from water sources. It is extremely difficult to transport these large animals, and in particular horses, to the location where the water exists. Since there are hundreds and even thousands of people at these shows, the movement of large animals to the water source may injure not only the animals, but also the spectators and individuals in close proximity to the animals.

Presently, there is a lack of easily transportable sources of water to remote locations. The only way to transport water to these remote locations, when the use of hoses or pipes are impractical, is to manually carry a bucket of water from the water source to the desired location. The drawbacks encountered in handling such large buckets filled with water are the weight of the filled buckets and the loss of water during the transporting/handling process.

It is therefore an object of this invention to provide a multiple container transportation system which can easily and safely transport water substantial distances.

It is a further object of this invention to provide a multiple container transportation system in which the containers used therewith can be filled with water or other substances.

It is still a further object of this invention to provide a multiple container transportation system which substantially minimizes water spillage during transport thereof.

It is an even further object of this invention to provide a multiple container transportation system which eliminates the need for manual carrying of water buckets.

It is an even further object of this invention to provide a multiple container transportation system which can be readily used in the feeding or watering of animals.

SUMMARY OF THE INVENTION

The present invention overcomes the past problems associated with the transportation of water to remote locations. More specifically, the multiple container transportation system of this invention is made up of one or more uniquely designed container units removably mounted on a moveable frame. Although these containers are primarily intended to be used for the transportation of water, they can be filled with any substance which needs to transported from one location to another.

The container units are configured in such a manner that when placed upon the moveable frame they become securely locked into position not only while the moveable frame is its upright position, but also during the tilting of the frame during movement thereof. Each of the container units includes a container and a removable cover.

The top portion of the container is angled such that the front is of a height less than the height of the back. This angled top portion not only enables an animal to easily access the contents of the container, but also prevents the spilling of water or other contents from the container even with the tilting of the moveable frame during transportation thereof. A lip surrounds the periphery of the angled top portion and has indentations therein for engaging the frame to prevent movement of the container during transportation. The bottom of each container has a locking notch therein which secures the bottom container to the moveable frame. In addition, the bottom of the container is capable of nesting within the cover of an adjacent container.

The cover has an angled bottom which has a front height greater than the back height such that when in position on a container it matingly engages with the angled top portion of the container. This design enables the top of the cover to remain substantially parallel to the bottom and effectively support another container thereon.

The frame is made of a light weight construction having an upstanding portion, a pair of wheels at one end thereof, a supporting member positioned adjacent the wheels to maintain the frame in an upright position during nonmovement thereof, and a handle at the other end thereof for enabling an individual to easily tilt and move the frame including the container units mounted thereon. In addition, the frame is designed to receive indentations on the container thereby preventing the containers from falling off or shifting during the movement of the frame.

For a better understanding of the present invention, together with other and further objects, reference is made to the following description taken in conjunction with the accompanying drawings, and its scope will be pointed out in the appended claims.

DETAILED DESCRIPTION OF THE PREFERRED EMBODIMENT

Figure 1:
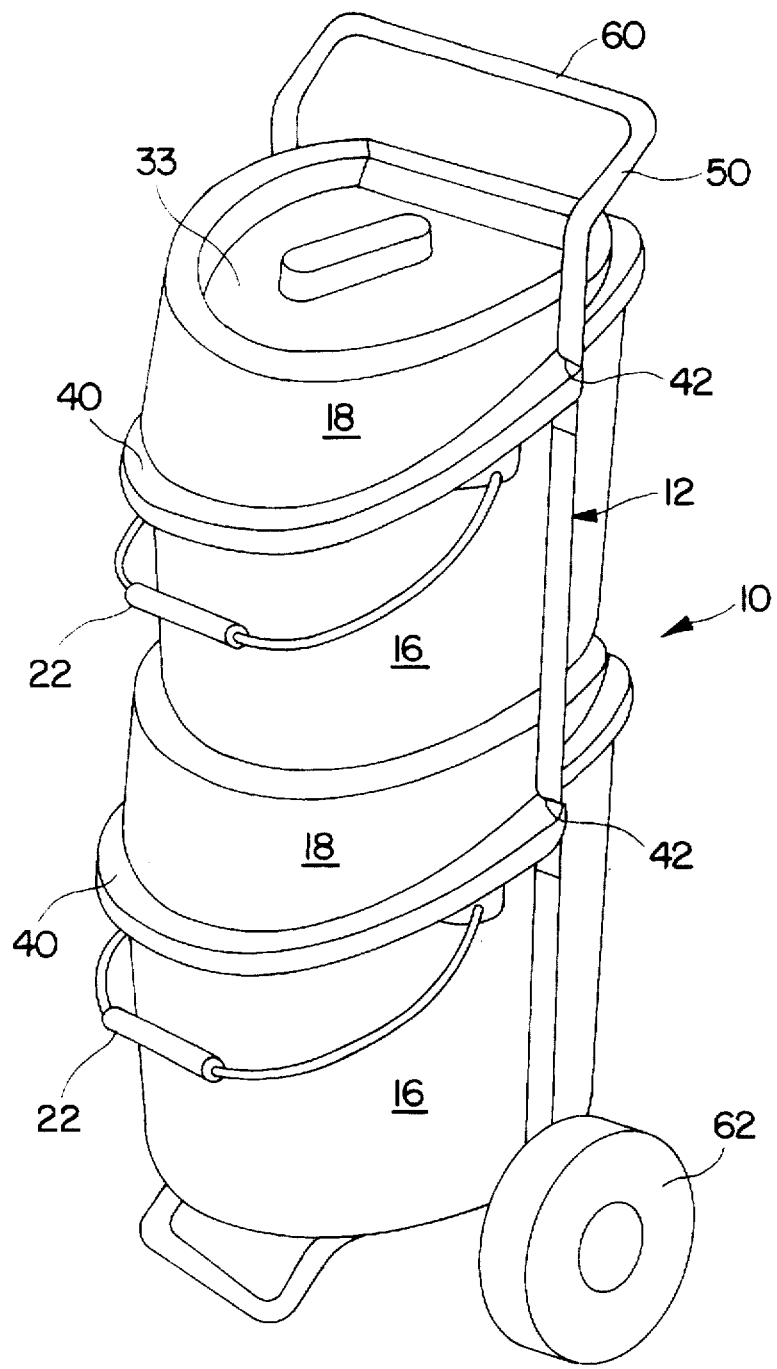
FIG. 1 is a pictorial illustration of the multiple container transportation system of this invention.

Reference is now made to FIG. 1 of the drawings which pictorially illustrates the container transportation system 10 of the present invention. The container transportation system 10 is made up of a moveable frame 12 having one or more container units 14 removably mounted thereon for transportation from one location to another. Preferably, the container transportation system 10 of this invention is utilized for transporting water to remote locations where access to a supply of water by animals is lacking. This situation generally occurs at horse fairs or agricultural events where the animals, such as horses, are located at a great distance from a water supply. However, it should be realized that the container transportation system 10 of this invention can also be used in gardening and housework.

The container transportation system 10 of this invention enables water to be filled into the container units 14 directly at the source of water and these container units can then be mounted upon the frame 12 and easily transported to animals at a remote location. As a result of the unique design of the container units 14, water contained therein is not spilled during movement thereof. When the water reaches the location of the animals, the unique configuration of the container unit 14 permits the animals to easily drink therefrom. The container units 14 are also designed in such a manner as to be removable secured within the frame, one upon another, such that the container units 14 when mounted one upon the other, will not accidentally disengage from each other or from the frame even though the frame may be tilted during the movement thereof.

Figure 2:
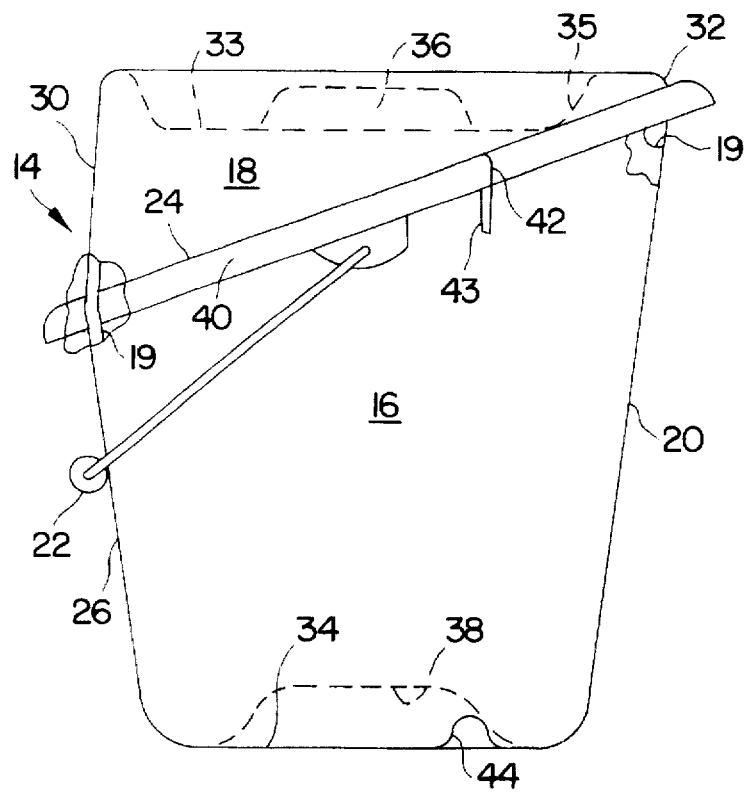
FIG. 2 is a side elevational view of the container unit utilized with the multiple container transportation system of this invention.
Figure 3:
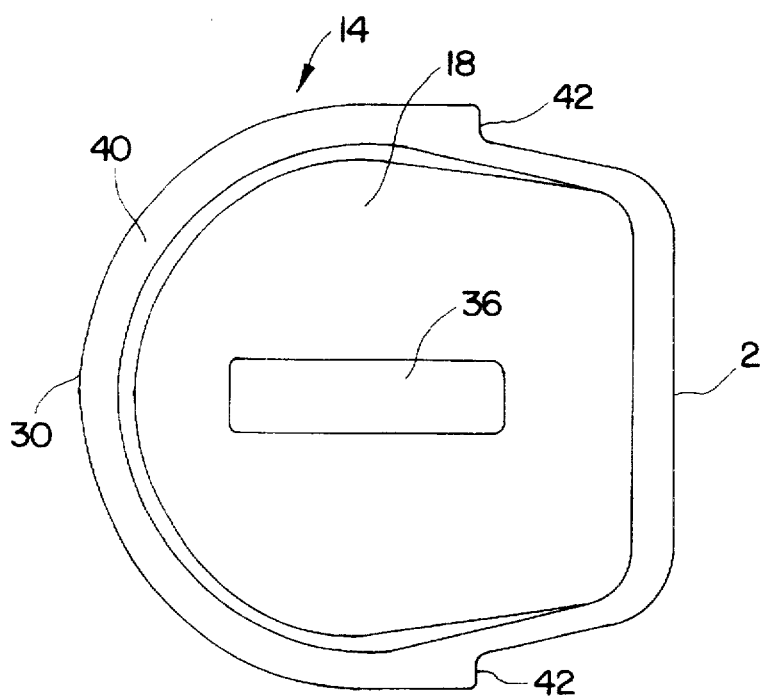
FIG. 3 is a top view of the container unit of FIG. 2.

More specifically, and referring to FIGS. 2 and 3 of the drawings, each of the container units 14 includes a container 16 and a cover 18, each being made of any suitable lightweight, high strength material such as plastic or aluminum. The container 16 is configured with a flat external rear or back portion 20 (more clearly shown in FIG. 3 of the drawings) which enables the container 16 or container unit 14 to be hung against a wall by a handle 22 when in its raised position. As clearly shown in FIGS. 2 and 4, the top portion 24 of container 16 is angled from front 26 to back 20 such that the height of the front 26 of the container 16 is less than the height of the flat back 20. This angled configuration, although not limited to a specific number of degrees from the horizontal, can be approximately 20 degrees from the horizontal to permit an animal to easily access the interior of container 16 when the animal is facing the front 26 of container 16. In addition, the angular top configuration of container 16 prevents water from spilling from the container when the container unit 14 is placed or mounted on frame 12 and frame 12 is tilted for movement thereof.

A cover 18 is positioned upon the container 16. In order to aid in the removal thereof, cover 18 is positioned upon container 16 within a groove 19 located in the peripheral edge of container 16. In the alternative, container 16 may have a protrusion which fits within cover 18. Either of these arrangements will prevent the cover 18 from slipping off container 16. Further describing cover 18, it is essential that cover 18 have a front 30 which is greater in height than the rear 32 so that the resultant container unit 14 with cover 18 in place, has the top 33 of cover 18 substantially parallel to the bottom 34 of container 16. This enables the mounting of another container thereon in a straight and upright position.

In order to aid in the mounting of a second container 16 upon a first container 16 within frame 12, an indentation 35 is formed within the top of cover 18 as shown in FIG. 2 of the drawings. This indentation 35 is configured to accept the bottom 34 of a container 16. In addition, a handle 36 is located within the indentation 35 enabling a user to easily remove the cover 18. Also as shown in FIG. 2 of the drawings, an indentation 38 is formed within the bottom of container 16 so as to accept the handle 36 of an adjacent container.

Figure 4:
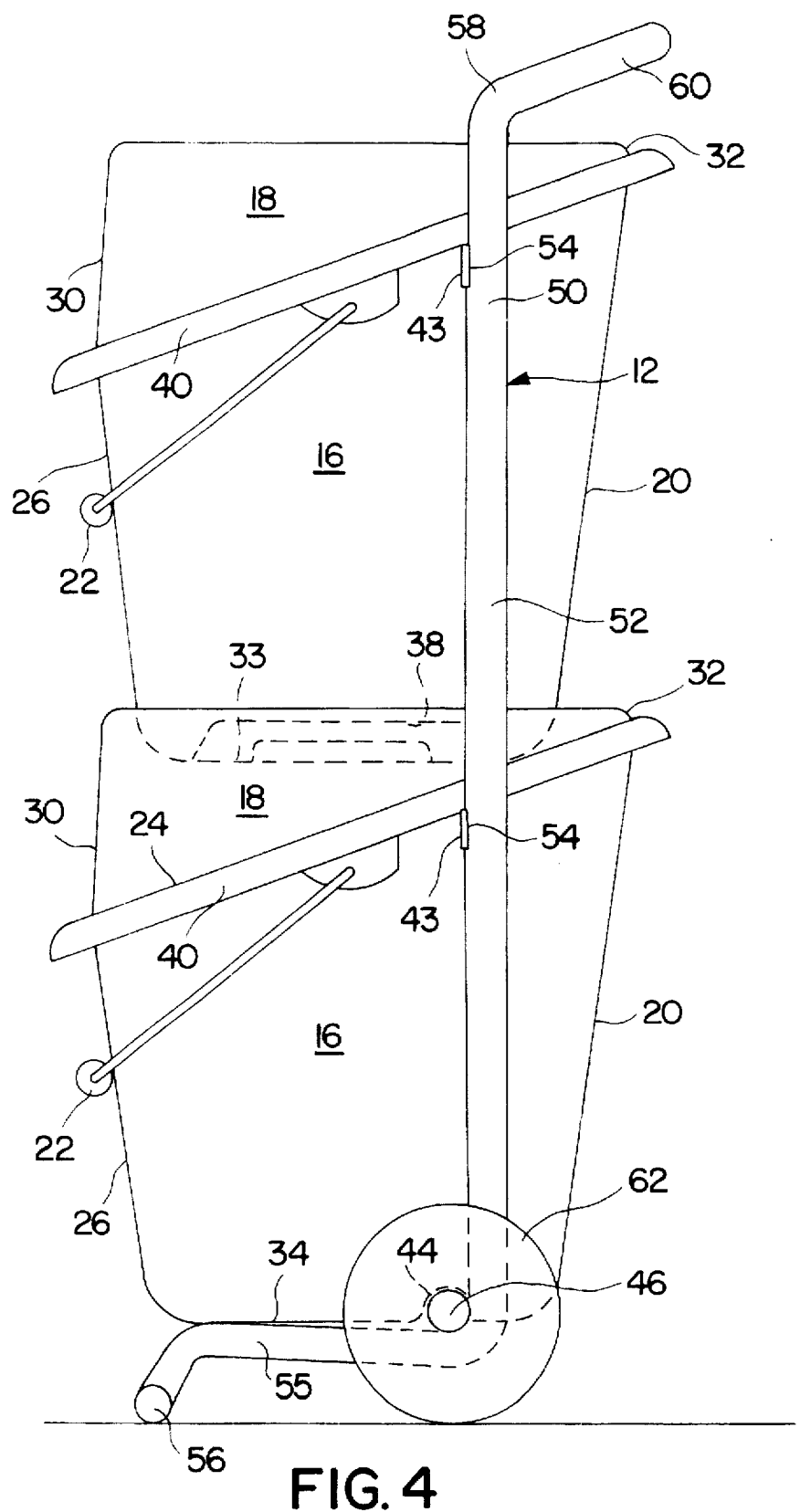
FIG. 4 is a side elevational view of the multiple container transportation system of this invention.

Referring once again to container 16, as shown in FIGS. 2 and 4 of the drawings, circumscribing the angled top portion 24 of container 16 is a lip 40 having indentations 42 therein. The indentations 42 enable the container unit 14 to mount against the frame 12 as shown in FIGS. 1 and 4 of the drawings. An extension 43 is located adjacent to each indentation 42 so as to provide a more secure engagement to occur between the container unit 14 and the frame 12. This extension 43 is clearly shown in FIG. 2 and FIG. 4 of the drawings. In addition, container 16 has a notch 44 on the bottom 34 to engage the axle 46 of frame 12. This arrangement is also clearly shown in FIGS. 2 and 4 of the drawings.

The frame 12, clearly shown in FIGS. 1 and 4 of the drawings, is made of a tubular member 50 of any suitable material such as aluminum having an upright portion 52 with flattened areas 54 thereon to accommodate the extensions 43 of container unit 14. The frame is bent at the bottom 55 to act as a support for the bottom container 16 and to provide a stand 56 for supporting the container units 14 when the frame is in a stationary position. The opposite end 58 of frame 12 is shaped into a handle 60. An axle 46 passes through member 50 at the bottom thereof. Attached to each end of axle 46 is a wheel 62. Although the frame 12 is depicted as being made of a bent frame design any other similar design which meets the criteria of this invention would also be acceptable.

One container unit 14 is positioned upon the bottom 55 of frame 12 such that notch 44 engages axle 46 and indentations 42 and its related extension 43 engage the flat portion 54 of frame 12. This arrangement securely affixes the bottom container 16 to frame 12. With the cover 18 in place upon container 16, a second container can be inserted with its bottom 34 inserted within indentation 35 of container 16. In position within the bottom container 16, the top container 16 is also mounted against frame 12 in the same manner as the bottom container 16. In this manner, multiple containers securely fit within the frame 12.

For movement of frame 12 to occur, the frame 12 is tilted and thereafter wheeled to the desired location. The tilting of the frame does not affect the contents of the container units 14 since the angled top portion 24 of container 16 inhibits spilling, even with the cover 18 removed or loosely engaging container 16. Furthermore, the indentation 42 and notch 44 securely hold the container units 14 in place even during tilting and movement of frame 12.

Although the invention has been described with reference to a particular embodiment, it will be understood that this invention is also capable of further and other embodiments within the spirit and scope of the appended claims. For example, the preferred use of the container transportation system 10 of this invention involves the movement of water from one location to another. It should be realized, however, that the container transportation system 10 of this invention can also be used to transport grain or any other material in an easy and safe manner. The unique configuration of the containers 16 allow easy for access to any type of contents within the container 16.

What is claimed is:

1. A container transportation system for use primarily in the watering and feeding of animals, said system comprising:
   a moveable frame, said frame being formed of a base and a pair of upstanding elements spaced apart from each other a predetermined distance, said base having means thereon for transporting said frame from one location to another and a member interposed between said spaced apart upstanding elements;
   at least one container, said container having
      a front portion, a back portion and a closed bottom portion, said front and said back portions having a lip at least part way therearound, said lip having a pair of indentations therein separating said front portion from said back portion, and said bottom portion having a notch therein extending from side to side, said back portion having a width slightly less than said predetermined distance between said pair of upstanding elements such that said back portion fits between said pair of upstanding elements when said container is mounted upon said base,
   means thereon for removably securing said container to said moveable frame, said means for removably securing said container to said frame including said indentations for engaging said upstanding elements, and said notch in said bottom portion for engaging said member, and an open top portion of predetermined internal size and said closed bottom portion being of a predetermined external size less than said predetermined size of said top portion; and a cover positionable upon said top portion of said container, said cover being configured with a top surface such that the top surface of said cover, when in position on said top portion of said container, is substantially parallel to said bottom portion of said container, wherein another container can fit upon said cover of said one container without spilling any contents contained therein;

whereby said at least one container can be readily transported from one location to another.

2. A container transportation system as defined in claim 1 wherein said top portion is angled from the back portion of said container to the front portion of said container such that said front portion of said container has a height less than the height of said back portion of said container;

wherein the contents of said container can be readily accessed by an animal.

3. A container transportation system as defined in claim 2 wherein said cover is angled from back to front such that the front of said cover has a height greater than the height of said back of said cover and said top surface is substantially flat.

4. A container transportation system as defined in claim 3 comprising at least two of said containers, said cover of each of said containers having an indented portion in the top thereof for receiving the bottom portion of the other of said containers.

5. A container transportation system as defined in claim 4 wherein said angled top portion of each of said containers has means thereon for positioning said cover thereon for easy removal thereof; and said angled top portion of said container also prevents said contents from spilling out of said container when said frame is tilted during movement thereof.

6. A container transportation system as defined in claim 5 wherein said container includes a handle pivotally mounted thereon and the back portion of said container having its exterior surface substantially flat.

7. A container transportation system as defined in claim 6 wherein each of said covers has a handle thereon and said bottom portion of each said container has an indented area therein for accepting therein said handle of said cover when one said container is mounted upon another of said containers.

8. A container transportation system as defined in claim 2 wherein said container includes a handle pivotally mounted thereon and the back portion of said container having its exterior surface substantially flat.

9. A container transportation system as defined in claim 8 wherein said securing means on said lip is in the form of a pair of indentations and extensions situated adjacent thereto for engaging said frame.

10. A container transportation system as defined in claim 1 wherein said removable securing means on said lip further comprises extensions situated adjacent said indentations for engaging said upstanding elements of said frame.

11. A container transportation system as defined in claim 1 wherein said means for transporting said frame from one location to another comprises an axle and a pair of wheels affixed to opposite ends of said axle, and wherein said member interposed between said spaced apart upstanding elements comprises said axle.

12. A container transportation system for use primarily in the watering and feeding of animals, said system comprising:

a moveable frame, said frame being formed of a base and a pair of upstanding elements spaced apart from each other a predetermined distance, said base having means thereon for transporting said frame from one location to another and a member interposed between said spaced apart upstanding elements;

at least one container, said container having a front portion, a back portion and a closed bottom portion, said front and said back portions having a lip at least part way therearound, said lip having a pair of indentations therein separating said front portion from said back portion, and said bottom portion having a notch therein extending from side to side, means thereon for removably securing said container to said moveable frame, said means for removably securing said container to said frame including said indentations for engaging said upstanding elements, and said notch in said bottom portion for engaging said member, a handle pivotally mounted thereon and the back portion of said container having its exterior surface substantially flat, and an open top portion of predetermined internal size and said closed bottom portion being of a predetermined external size less than said predetermined size of said top portion; and a cover positionable upon said top portion of said container, said cover being configured with a top surface such that the top surface of said cover, when in position on said top portion of said container, is substantially parallel to said bottom portion of said container, wherein another container can fit upon said cover of said one container without spilling any contents contained therein;

whereby said at least one container can be readily transported from one location to another.

13. A container unit comprising:

a container having a front portion, a back portion, an open top portion and a closed bottom portion, said front and said back portions having a lip at least part way therearound, said lip having a pair of indentations therein separating said front portion from said back portion, and said bottom portion having a notch therein extending from side to side, said rear portion having a width less than that of said front portion, said open top portion being of predetermined internal size, and said top portion is angled from the back portion of said container to the front portion of said container such that said front portion of said container has a height less than the height of said back portion of said container; and said closed bottom portion being of a predetermined external size less than said predetermined size of said top portion; and a cover positionable upon said top portion of said container, said cover being configured with a top surface such that the top surface of said cover, when in position on said top portion of said container, is substantially parallel to said bottom portion of said container, wherein another container can fit upon said cover of said one container without spilling any contents contained therein.

14. A container unit as defined in claim 13 wherein said cover is angled from back to front such that the front of said cover has a height greater than the height of said back of said cover.

15. A container unit as defined in claim 14 wherein said back portion of said container having its exterior surface substantially flat and said container includes a handle pivotally mounted thereon.

* * * * *